Nov. 25, 1969  L. E. TILBURY ET AL  3,480,085
DISK HARROW

Filed April 12, 1967  5 Sheets-Sheet 1

INVENTORS
LAWRENCE E. TILBURY
STEVEN E. MAPLE

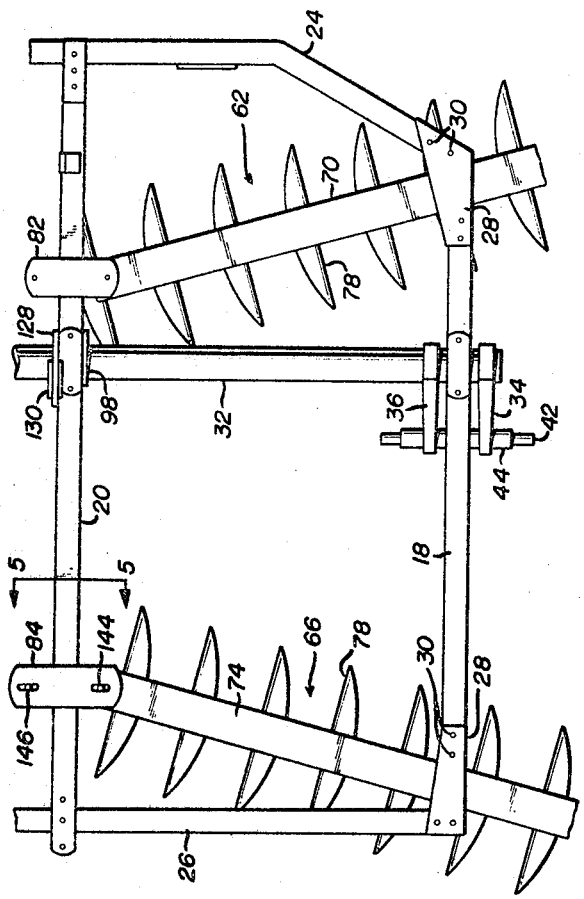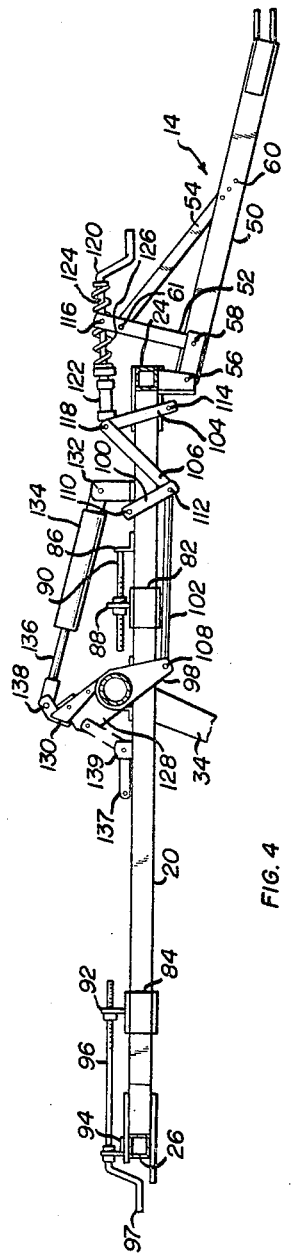

INVENTORS
LAWRENCE E. TILBURY
STEVEN E. MAPLE

Nov. 25, 1969   L. E. TILBURY ET AL   3,480,085
DISK HARROW
Filed April 12, 1967   5 Sheets-Sheet 5

INVENTORS
LAWRENCE E. TILBURY
STEVEN E. MAPLE

United States Patent Office 3,480,085
Patented Nov. 25, 1969

3,480,085
DISK HARROW
Lawrence E. Tilbury and Steven E. Maple, Rockford, Ill., assignors to J. I. Case Company, Racine, Wis., a corporation of Wisconsin
Filed Apr. 12, 1967, Ser. No. 630,451
Int. Cl. A01b 59/042, 15/16, 49/00
U.S. Cl. 172—328                                    1 Claim

ABSTRACT OF THE DISCLOSURE

A wheel type tandem disk harrow adapted to be towed by a vehicle in either working or transport position wherein the harrow frame is maintained substantially level. The harrow has a plurality of angularly adjustable front and rear disk gang assemblies and the rear gangs can be moved laterally in relation to the frame.

BACKGROUND OF THE INVENTION

In the art of earth working implements, the wheel type tandem disk harrows have had great success as these harrows have been made available in larger sizes. The harrows have included front and rear gang assemblies which can be angularly adjusted in relation to the main frame and hydraulic means has been used to raise and lower the wheels for either the earth working position or for transport of the harrow. The angular adjustment of the gang assemblies usually includes threaded means which are manually operated; however, there possibly may be large machines which use power controlled adjusting devices such as hydraulic cylinders.

The present invention relates to these large tandem-type machines and while much of the background material is included in the disk harrow to be shown and described, the industry is providing larger and improved disk harrows for working behind the larger tractors. Various adjusting devices are now being incorporated in these harrows to provide for differences in soil conditions, as the operator wishes to obtain maximum tillage with only one trip across the field. With the advent of the larger machines, means are necessary to have the disks cut the soil at equal depth across the width of the machine. Also there should be a certain amount of flexibility in the machine to take care of uneven surfaces. The rear disk gang assemblies in a tandem machine should be laterally adjustable to properly till the soil so that there will not be a ridge of soil or a furrow left behind the center of the harrow.

SUMMARY OF THE INVENTION

This invention relates to tractor drawn wheel type tandem disk harrows and more particularly to means for adjusting the disk gang assemblies. The harrow incorporates linkage means for maintaining the frame in a substantially level position as the wheels are raised or lowered. It also includes adjusting means for laterally displacing the rear gang assemblies so that proper tillage is accomplished across the field. The raising and lowering of the harrow includes a hydraulic cylinder connected to the frame and to the cross shaft which carries the wheels. The lift linkage and the hitch assembly are designed such that as the hydraulic cylinder is operated, it activates the cross shaft and by means of a lever on the shaft connected to the parallel linkage, the frame of the machine is kept substantially level in relation to the ground and the hitch. Means are also provided for adjusting the hitch to a vehicle drawbar.

The rear gang lateral adjustment is especially important when a ridge of soil or a furrow is left at the center of the harrow after the front gang assembly has passed. Depending upon the angular adjustment of the disk gangs in relation to the main frame, a ridge or a furrow may be left and it is desirable to have adequate tillage and also a substantially level seed bed. The lateral adjustment connects between the two rear gangs at the center of the harrow so that the entire rear gang is moved inward or outward until the proper position of the gangs is obtained to correct the ridge or the furrow condition.

Another feature of the larger harrow is the provision of wing gangs for adding to the tillage width. These gangs are extensions of the front and rear gangs and include hold down means which secure the wing gangs in the earth working position.

When in transport position the wing gangs are rotated and folded on the front and rear gangs. A transport latch is also provided to secure the wing gangs in the folded position. These wing gangs are sometimes left in the folded position when disking the soil if extra weight is desired on the main frame.

The main object of the present invention is to provide an improved disk harrow of the wheel type.

Another object is to provide lift linkage means which maintains the harrow frame substantially level at all times.

A further object is to provide a hitch assembly which is spring cushioned and adjusts to any tractor drawbar height.

An additional object is to provide lateral adjustment of the rear disk gangs.

Another object is to provide improved hold down and transport latches on the gang frames.

Additional objects and advantages will become apparent from a reading of the following description taken together with the annexed drawings, in which:

FIG. 3 is an enlarged plan view of a portion of the disk harrow with certain parts removed;

FIG. 4 is a side elevation of the parallel lift linkage;

Figure 1:
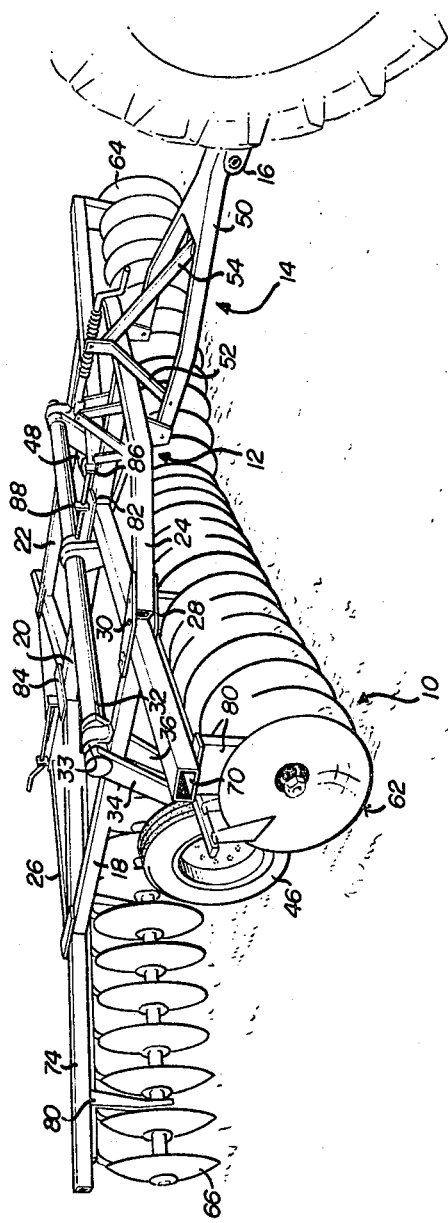
FIG. 1 is a perspective view of a tandem disk harrow of the wheel type described.
Figure 2:
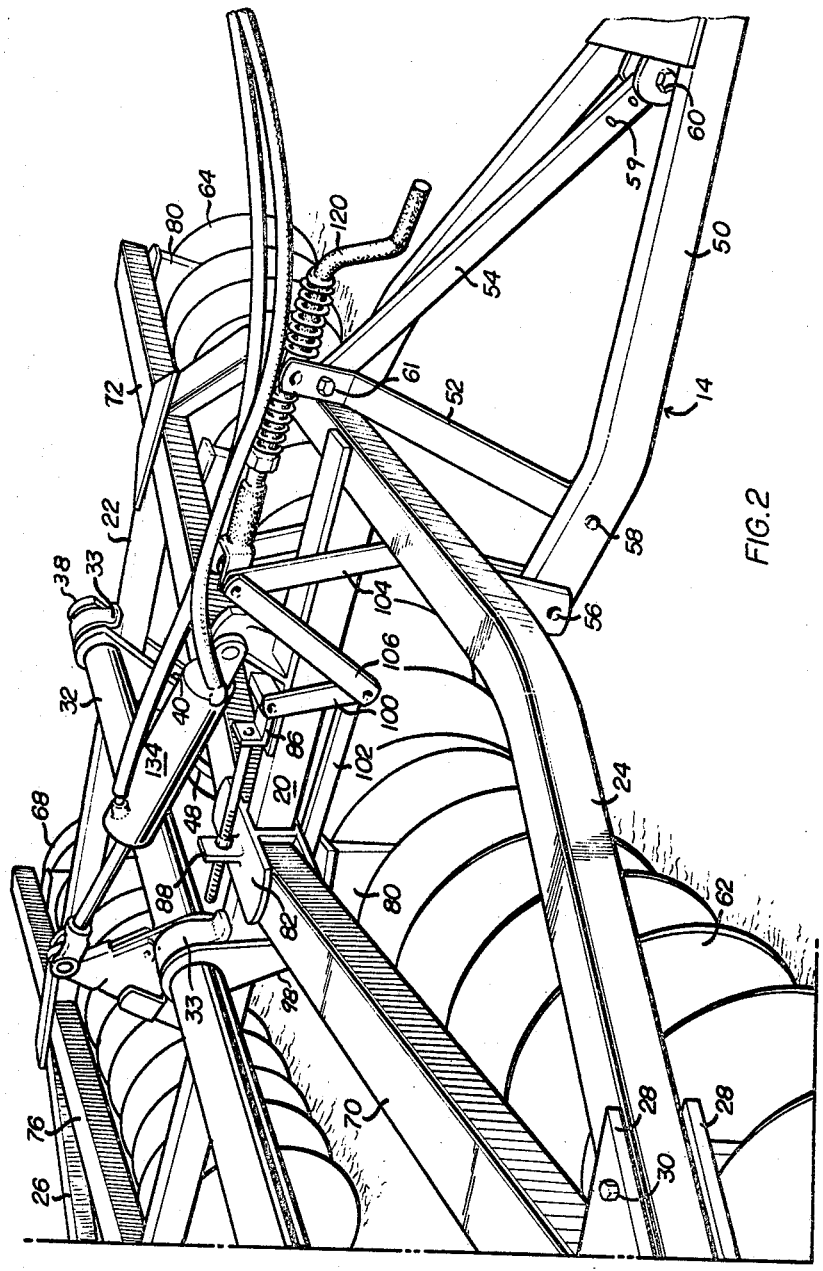
FIG. 2 is an enlarged view of the harrow showing the parallel lift linkage.

In FIG. 1 there is shown a tandem disk harrow, generally designated as 10, having a main frame 12 and a hitch assembly 14 connected to a tractor drawbar 16. Main frame 12 includes fore-and-aft or longitudinal members 18, 20 and 22, members 18 and 22 being the outer ones and member 20 being the center one. Main frame 12 also has front and rear transverse members 24 and 26 connected by means of corner plates or gussets 28 and bolts 30. As seen in FIGS. 1 and 2, the gussets are secured on the top and bottom of the longitudinal and the transverse members and several of the bolts 30 extend through the gussets and the frame members to provide a sturdy and rigid structure. The frame members are aligned in the same plane which gives a simple, economical, and strong support for the disk units. Gussets 28 may have different sizes and shapes, as seen in FIG. 3, for the several connecting points.

Frame members 18, 20 and 22 carry a transverse axle member 32 which is journaled on the frame by means of bearing straps 33. Wheel arms 34 and 36 are rigidly connected to the right-hand end of member 32 and arms 38 and 40 are connected to the left-hand end. As seen in FIG. 3, arms 34 and 36 are positioned on either side of member 18 and carry a two hub spindle 42 journaled in a sleeve 44 on the arms. Arms 38 and 40 on the left-hand side of member 32 are similarly constructed and carry a spindle 42 journaled in a sleeve 44 on the arms. Ground engaging wheels 46 and 48 are carried on spindles 42 and since the spindles extend on either side of the arms, the wheels can be installed on either side of members 18 or 22. Since harrow widths vary, the wheels can be installed on the outside or inside of members 18 and 22 and in the case of the widest harrows, dual wheels can be installed on each spindle.

Hitch 14 includes a yoke member 50 pivotally connected to front frame member 24 and also includes a mast arm 52 and a mast brace 54. FIG. 4 shows a side view of the hitch members and the pivot pins 56, 58, 60 and 61. Brace 54 has several openings 59 near the forward end so that the hitch yoke can be adjusted up or down for drawbar height.

Figure 5:
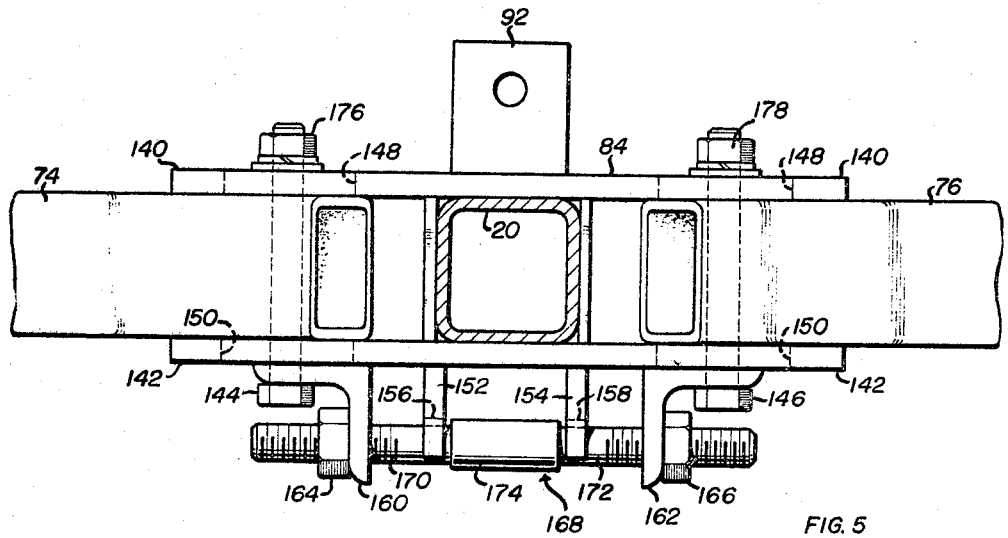
FIG. 5 is a detailed view of the lateral adjustment of the rear gang frames taken on the line 5—5 of FIG. 3.

Main frame 12 carries right and left-hand front disk gang assemblies 62 and 64 and right and left rear gang assemblies 66 and 68. These assemblies include frame members 70, 72, 74, and 76, and disks 78 supported from the gang members by means of standards 80 clamped to the gang frames. The right and left gang frames are connected across the center frame 20 by means of anchors 82 and 84. These anchors surround the center frame, as shown in FIG. 5 with anchor 84, and include apertured portions which overlap the gang frames and bolts are used to secure the anchors to the gang frames. Anchors 82 and 84 are designed to be slidable along center frame 20 when angularly positioning the gang frames. A lug 86 is connected to center frame 20 rearward of member 24 and a lug 88 is fixed to anchor 82. These lugs have openings for receiving a threaded rod 90 and locking nuts are disposed on the rod and on either side of lug 88. The nuts are turned in the desired direction and anchor 82 is moved along center frame 20 and carries members 70 and 72 to the desired angle in relation to the main frame.

In similar manner the rear gangs are angularly disposed in that a lug 92 is fixed to anchor 84 and a lug 94 is attached to center frame 20 and rear frame member 26. These lugs also have openings for receiving a threaded rod 96 and locking nuts are placed on the rod adjacent the lugs. As the rod is turned by a crank 97 the rear gangs are angularly moved by means of anchor 84 sliding along center frame 20.

A leveling linkage connects the hitch assembly 14 and the axle member 32. Axle 32 has a downwardly extending arm 98 fixed thereto adjacent the bearing strap 33 on center frame 20. Forward of arm 98, a rod link 100 is pivotally carried by member 20 and a linkage rod 102 is pivotally connected to the arm and the rod link. As seen in FIG. 4, rod 102 is disposed below member 20. A clevis link 104 is pivotally carried by member 20 and a clevis to rod link 106 connects link 104 and link 102. Pivot pins 108, 110, 112, and 114 are inserted through the links in the positions shown in FIG. 4. A leveling device is pivotally connected to mast arm 52 and to clevis link 104 and rod link 106 by means of pins 116 and 118. The device includes a crank 120, a leveling link 122 and compression springs 124 and 126. Spring 124 encircles the crank rod forward of mast arm 52 and spring 126 encircles the rod rearward of arm 52. The crank rod is threaded and the leveling link 122 receives one end of the rod. Stop means such as jamnuts are used on the crank rod to limit the travel of the springs and the crank.

The leveling linkage is required to keep the main frame substantially in a horizontal plane so that the front and rear gang disks cut the soil at a uniform depth. With the disk gangs on the ground, the hitch is connected to the tractor drawbar and one of the holes 59 in the mast brace 54 is selected for pin 60, depending upon the drawbar height. The leveling crank 120 is then turned in the proper direction until the main frame is level. The stop nuts are then adjusted along the crank rod to equalize the compression in the springs. The springs allow the hitch to flex in relation to the main frame as the harrow is drawn across uneven land.

Hydraulic means are used for raising and lowering the wheels in relation to the main frame. A lift arm 128 is fixed to axle member 32 adjacent the center frame bearing strap 33 and a pivot anchor 130 is secured to the lift arm. An upstanding bracket 132 is fixed to center member 20 ahead of the axle member. A hydraulic cylinder 134 is pivotally connected to bracket 132 and a piston rod 136 is connected to anchor 130 by a pin 138. Hydraulic fluid carrying hoses are connected between the cylinder and the tractor for moving the piston head in the cylinder.

In the disking position, the wheels should be in contact with the ground and the main frame should be level. When it is desired to raise the wheels in relation to the main frame as in the disking position, the cylinder rod 136 is retracted into the cylinder by the force of the hydraulic fluid. The pivot anchor 130 and lift arm 128 are rotated in a clockwise direction as seen in FIG. 4. The wheel arms and wheels are also rotated to swing the wheels in a clockwise direction and the disk is lowered to the ground. Since the leveling linkage is connected between the hitch assembly and the arm 98, the linkage is moved as the axle is rotated and the harrow frame is maintained in a parallel position. As arm 98 is rotated clockwise, linkage rod 102 is pulled rearwardly and rod link 100 is rotated clockwise around pin 110. Link 104 being attached to the frame pivots on pin 114 and rotates counter-clockwise and link 106 is rotated clockwise around pin 118, pin 112 moving rearwardly with linkage rod 102. Mast arm 52 is rotated counter-clockwise and leveling rod 120 is moved rearward in relation to frame member 24. The actions described alter the angle between the frame 20 and the hitch yoke 50 about the pins 56, so the frame 20 moves downwardly. It is thus seen that when the hydraulic cylinder is actuated to turn the axle 32, through the use of the described linkage, the frame is kept substantially level during the raising and lowering of the harrow. Of course, when the harrow is to be raised, the opposite movement of the parts takes place as piston rod 136 is extended. Also, a transport latch 137 is pivotally connected to a lug 139 which lug is fixed to member 20. In the earth working position of the disks, the latch lies on member 20 and in the transport position of the harrow, the latch is connected to arm 128, as shown dotted in FIG. 4, to relieve pressure on the hydraulic system.

In FIG. 5 is shown the means for laterally adjusting the rear gang assemblies. As stated, an anchor 84 surrounds the center frame 20 and the anchor has top and bottom apertured portions 140 and 142 which overlap the gang members 74 and 76. Bolts 144 and 146 are inserted through the overlapping portions of the anchor and through the gang frames 74 and 76. Portions 140 and 142 have slotted openings 148 and 150 extending laterally and spaced from center member 20, also seen in FIG. 3. Anchor 84 also has downwardly extending portions 152 and 154, the portions having open slots 156 and 158. Right and left-hand brackets 160 and 162 are inserted between the heads of bolts 144 and 146 and the lower portions 142 of the anchor 84. Nuts 164 and 166 are secured to the brackets on the adjacent angular side and are an integral part thereof. A lateral adjusting screw 168 includes oppositely threaded ends 170 and 172 and a central portion 174 constructed to receive a wrench for turning the screw. Portion 174 fits between anchor ears 152 and 154 to maintain alignment of the adjusting screw.

When a ridge of soil is left behind the center of the harrow, the rear gangs should be set out so as not to throw the soil in a heap, and when a furrow is formed behind the center of the harrow, the rear gangs should be moved together to fill the furrow.

When adjusting the rear gangs laterally, nuts 176 and 178 are loosened and the bolts 30 on rear gussets 28 are loosened so that gang frames 74 and 76 are free to move in relation to members 18 and 22. The screw portion 174 is turned in the desired direction which threads the end portions 170 and 172 in nuts 164 and 166 and moves brackets 160 and 162 which positions bolts 144 and 146 along slots 148 and 150. In this manner, both gangs are repositioned an equal distance from the center of the harrow.

Figure 6:
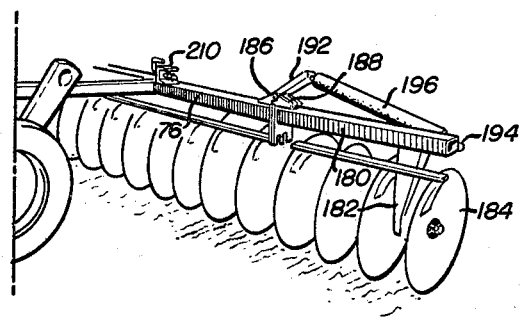
FIG. 6 is a view of one of the wing gangs in the operating position.
Figure 7:
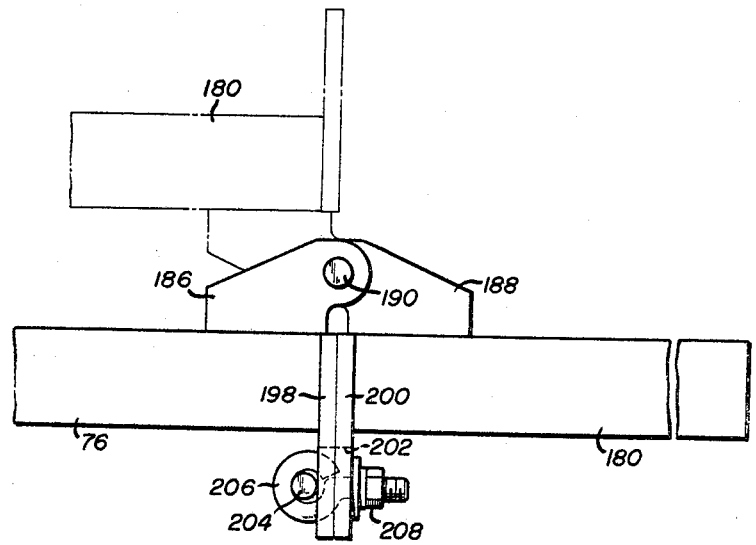
FIG. 7 is a detailed view of the wing gang hold down device.

The large capacity or wide harrows are equipped with wing gangs as shown in FIG. 6. As there are four of these units, only one will be described. The wing gang assembly includes a gang frame 180 carrying standards 182 and disks 184, the wing assembly being an extension of the main gang assembly. An apertured bracket 186 is secured to the end of the main gang frame member 76 and a similar bracket 188 is secured to the inner end of the wing gang frame 180. These brackets are designed to fit together and a hinge pin 190 is inserted in the openings in the brackets as seen in FIG. 7. An arm 192 is secured to the main gang frame 76 and a bracket 194 is secured to the outer end of the wing frame 180. A lift spring 196 is connected to the arm and to the bracket and the tension on the spring is such as to aid in the manual raising of the wing gangs.

When the wing gangs are in the operating or disking position, a hold-down device keeps the gangs rigid with the main gangs. The main gang frame 76 has an end plate 198 secured to the end thereof and the wing frame 180 has an end plate 200 secured to the inner end, the plates matching each other to fit together. These end plates have slots 202 extending upwardly from the bottom edges of the plates, there being two slots in each plate. A rod 204 extending the width of the plates is attached to one side of plate 198 by means of small bolts and securing nuts. Eyebolts 206 are inserted in the slots 202 and rod 204 provides a pivot for the eyebolts to swing in a vertical plane. Nuts 208 on bolts 206 keep the end plates secure against each other and maintain the wing gangs in the operating position.

Figure 8:
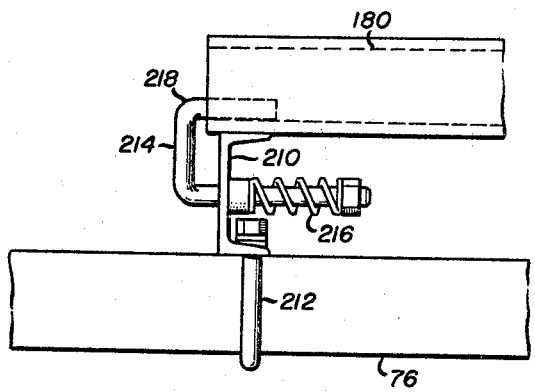
FIG. 8 is a detailed view of the wing gang transport latch.

When it is necessary to transport the harrow, the wing gangs are folded on the main gangs and a transport latch is provided on each main gang to keep its wing gang secure. A channel rest 210, as seen in FIG. 8, is fixed to the main gang frame 76 by means of a U-bolt 212. Rest 210 includes an opening and a J-shaped latch 214 is installed therein. Latch 214 includes a compression spring 216 to load the latch against rest 210. This provides a simple and easy method of securing the wing gang in the folded position, and as the J-latch is pulled inwardly, the short portion 218 slips into the end of the wing gang frame 180. The wing gang is sometimes folded to provide additional weight on the main gang when disking under adverse conditions. FIGS. 7 and 8 show a portion of the wing gang frame 180 in the folded position.

It is thus seen that herein shown and described is a tandem disk harrow which accomplishes all the objects and advantages as set out and includes many desirable features. While only one embodiment has been shown, variations on the above described construction may occur to those skilled in the art and it is to be understood that all such variations are contemplated as being within the scope of the invention. The invention is not intended to be taken as limited by the embodiment disclosed, nor in fact, in any manner except as defined in the following claims.

We claim:

1. In a tandem disk harrow of the type including a main frame, a hitch assembly pivotally connected with said main frame for towing said harrow, two front and two rear gang frames carried by said main frame and having earth working disks thereon, each of said gang frames having pivot means connected to said main frame for angularly positioning said gang frames in relation to said main frame, the improvement comprising adjusting means anchored on said main frame and being connected between the two said pivot means of said rear gang frames, said adjusting means being adjustable independent of pivotal motion of said rear gang frames about their said pivot means and including a slotted member on said main frame and extending laterally of the towed direction of said main frame and having slots oriented to have the slotted direction extend horizontally laterally in said slotted member, and said pivot means of each said rear gang frames including a member connected to said adjusting means and retained in respective ones of said slots and being slidable therealong for lateral movement of said rear gang frames relative to said main frame.

References Cited

UNITED STATES PATENTS

| 944,415 | 12/1909 | Conklin | 172—582 |
| 2,765,609 | 10/1956 | Oehler et al. | 172—328 |
| 2,797,542 | 7/1957 | Webster et al. | 172—328 |
| 2,897,905 | 8/1959 | McCleskey | 172—442 X |
| 2,970,656 | 2/1961 | Kampe | 172—328 X |
| 3,131,775 | 5/1964 | Long | 172—442 X |
| 3,193,023 | 7/1965 | Adee | 172—581 X |
| 3,362,484 | 1/1968 | Walberg | 172—568 |

ROBERT E. PULFREY, Primary Examiner

WALTER J. CONLON, Assistant Examiner

U.S. Cl. X.R.

172—311, 581, 582, 640